United States Patent [19]

Gierman et al.

[11] Patent Number: 5,449,216
[45] Date of Patent: Sep. 12, 1995

[54] INTEGRAL CHILD SEAT AND SEAT FRAME COMBINATION

[75] Inventors: Karl E. Gierman, Northville; Robert I. Homier, Plymouth, both of Mich.

[73] Assignee: Douglas & Lomason Company, Farmington Hills, Mich.

[21] Appl. No.: 390,386

[22] Filed: Feb. 17, 1995

Related U.S. Application Data

[63] Continuation of Ser. No. 125,426, Sep. 22, 1993, abandoned.

[51] Int. Cl.⁶ .............................................. B60N 2/30
[52] U.S. Cl. .............................. 297/216.11; 297/238
[58] Field of Search ................. 297/216.11, 216.13, 297/216.14, 238

[56] References Cited

U.S. PATENT DOCUMENTS

| | | |
|---|---|---|
| 1,965,048 | 6/1934 | Morris . |
| 2,337,480 | 12/1943 | Logan . |
| 2,436,294 | 2/1948 | Glatstein . |
| 2,584,481 | 2/1952 | Mast et al. . |
| 2,966,201 | 12/1960 | Strahler . |
| 3,094,354 | 6/1963 | Bernier . |
| 3,877,748 | 4/1975 | Eggert .......................... 297/216.13 |
| 4,060,278 | 11/1977 | Maeyerspeer ...................... 297/472 |
| 4,230,366 | 10/1980 | Ruda . |
| 4,533,176 | 8/1985 | Wyttenbach . |
| 4,540,216 | 9/1985 | Hassel, Sr. . |
| 4,541,654 | 9/1985 | Jonasson . |
| 4,555,135 | 11/1985 | Freeland . |
| 4,596,420 | 6/1986 | Vaidya . |
| 4,655,503 | 4/1987 | Kamijo et al. . |
| 4,664,443 | 5/1987 | Casale . |
| 4,690,449 | 9/1987 | Holman . |
| 4,690,455 | 9/1987 | Bailey et al. . |
| 4,722,568 | 2/1988 | Irvin . |
| 4,756,573 | 7/1988 | Simin et al. . |
| 4,768,827 | 9/1988 | Musgrove . |
| 4,900,086 | 2/1990 | Steward . |
| 4,900,087 | 2/1990 | Crisp . |
| 4,902,070 | 2/1990 | Casale et al. . |
| 4,913,498 | 4/1990 | Forlivio . |
| 4,936,627 | 6/1990 | Guim . |
| 4,936,631 | 6/1990 | Mochida et al. . |
| 4,938,527 | 7/1990 | Schmale et al. ................. 297/216.13 |
| 4,943,112 | 7/1990 | Law . |
| 4,986,600 | 1/1991 | Leblanc et al. . |
| 5,026,118 | 6/1991 | Vander Stel et al. . |

(List continued on next page.)

FOREIGN PATENT DOCUMENTS

| | | |
|---|---|---|
| 66992/90 | 12/1989 | Australia . |
| 0258194 | 8/1986 | European Pat. Off. . |
| 0286542 | 4/1987 | European Pat. Off. . |

(List continued on next page.)

OTHER PUBLICATIONS

The Integrated Child Seat: Elements Of Design (920494), J. Lambert, Atoma International, Inc. pp. 1 through 12.
Accessories Bulletin—Volvo Parts Division—Apr. 1991—940 Sedan Child Safety Cushion—No. 2.
Accessories Bulletin—Volvo Parts Division—Sep. 1990—Child Cushion & Backrest—No. 1.

*Primary Examiner*—Peter R. Brown
*Attorney, Agent, or Firm*—Harness, Dickey & Pierce

[57] ABSTRACT

A vehicular seat is disclosed having a built-in child restraint seat integrated into its underlying frame structure. Segments of the frame structure are adapted to yield in a controlled manner under certain high load conditions to absorb a portion of the loading that would ultimately be transmitted to a child strapped in the built-in child seat. The frame structure associated with the integrated vehicular seat of the present invention includes a seat cushion frame assembly and a seatback frame assembly. A modular child seat assembly is secured to the seatback frame assembly. The frame structure includes first yieldable means for permitting the seatback frame assembly to deform in a controlled manner relative to the seat frame assembly. The frame structure further includes second yieldable means for permitting the interconnection between the modular child seat assembly and the seatback frame assembly to also deform in a controlled manner.

13 Claims, 7 Drawing Sheets

U.S. PATENT DOCUMENTS

| | | |
|---|---|---|
| 5,100,199 | 3/1992 | Vander Stel et al. . |
| 5,106,158 | 4/1992 | Dukatz et al. . |
| 5,135,285 | 8/1992 | Dukatz et al. . |
| 5,161,855 | 11/1992 | Harmon . |
| 5,228,746 | 7/1993 | Burleigh .................. 297/250.1 |
| 5,282,668 | 2/1994 | Heussner et al. ............ 297/238 |

FOREIGN PATENT DOCUMENTS

| | | |
|---|---|---|
| 0324503 | 1/1988 | European Pat. Off. . |
| 0348374 | 6/1988 | European Pat. Off. . |
| 2307673 | 4/1975 | France . |
| 2624805 | 12/1987 | France . |
| 2665399 | 8/1990 | France . |
| 1949089 | 4/1971 | Germany ................ 297/216.14 |
| 2454573 | 5/1975 | Germany . |
| 7612141 | 4/1976 | Germany . |
| 2720954 | 12/1977 | Germany . |
| 7916857 | 6/1979 | Germany . |
| 2807064 | 8/1979 | Germany . |
| 2823529 | 12/1979 | Germany . |
| 2825329 | 12/1979 | Germany . |
| 3020212 | 12/1981 | Germany . |
| 3239292 | 5/1983 | Germany ................ 297/216.13 |
| 3215488 | 11/1983 | Germany . |
| 3716038 | 12/1987 | Germany . |
| 3631726 | 3/1988 | Germany . |
| 59-156836 | 6/1984 | Japan . |
| 2023415 | 6/1978 | United Kingdom . |
| 2122886 | 1/1984 | United Kingdom . |
| 2167949 | 12/1984 | United Kingdom . |
| 2209666 | 5/1989 | United Kingdom . |

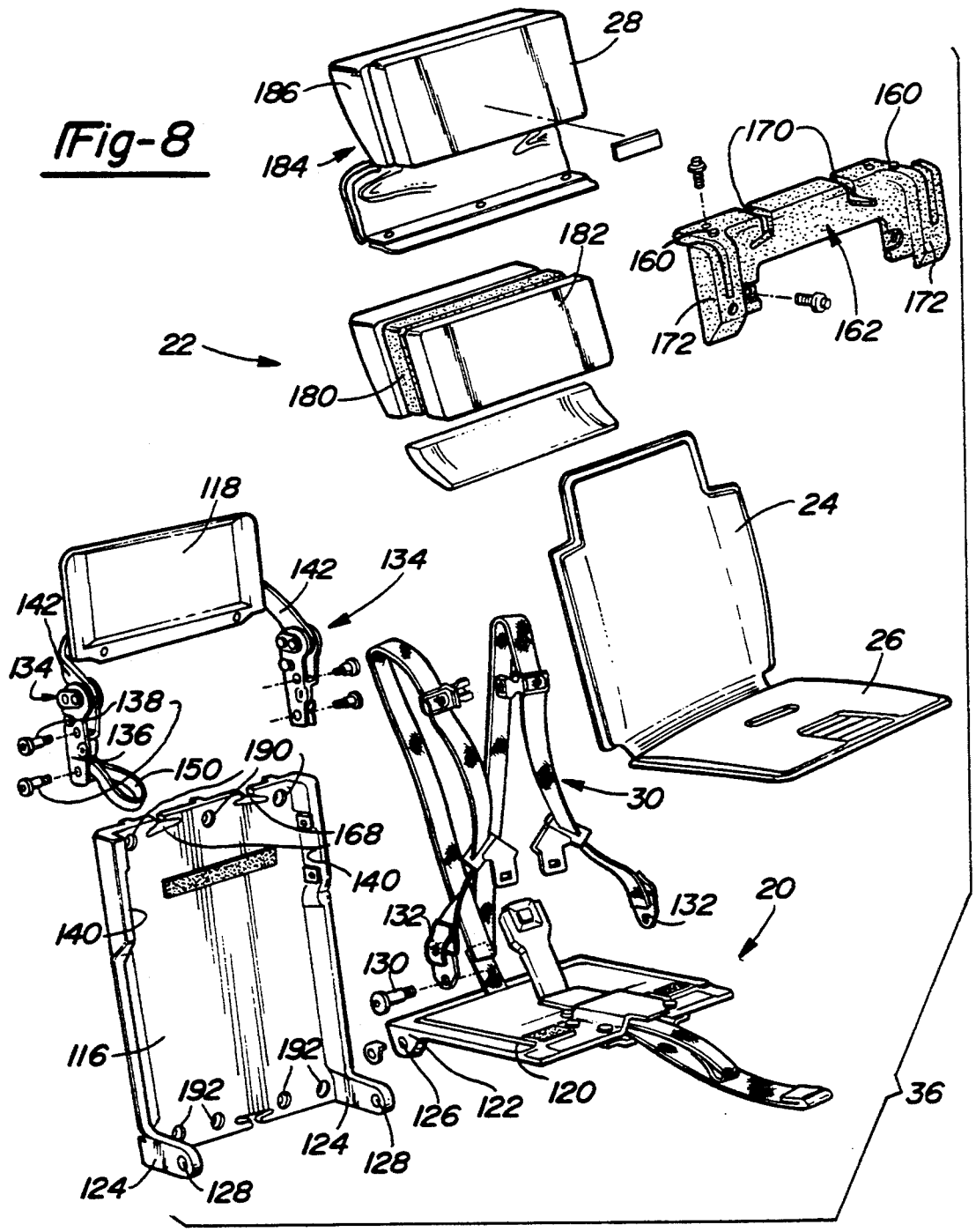

INTEGRAL CHILD SEAT AND SEAT FRAME COMBINATION

This is a continuation of U.S. patent application Ser. No. 08/125,426, filed Sep. 22, 1993, now abandoned.

BACKGROUND OF THE INVENTION

The present invention relates generally to automotive vehicle seating and, more particularly, to a vehicle seat having a built-in child restraint seat integrated into its underlying frame structure. The frame structure of the vehicle seat is adapted to yield in a controlled manner in response to the occurrence of a vehicular collision for absorbing a portion of the energy that would otherwise be transmitted to the occupant of the child restraint seat.

Virtually all automotive passenger-type motor vehicles are now equipped with safety belt restraint systems for physically restraining the seat occupant when the vehicle is subjected to a high rate of deceleration which may occur, for example, during heavy braking or a motor vehicle collision. While such conventional safety belt restraint systems are well suited for restraining adults and large children, it is a common practice to use a portable (i.e., "add-on") child restraint seat having a belt-type harness for children under a given size and weight. For instance, most portable child restraint seats are rated for children weighing up to forty pounds and are generally recommended for use with children under the age of four years. As is known, such portable child seats are placed on top of the vehicle seat and secured thereto using the existing vehicle mounted safety belt restraint system.

In an effort to minimize the inconvenience associated with installing and/or stowing portable child seats, some automotive passenger-type motor vehicles are now available with seating arrangements that have a "built-in" or integral child restraint seat integrated into the seatback frame of an otherwise conventional seat. When the built-in child seat is stowed, the seating arrangement accommodates adults and large children in a normal seated position while preserving the overall cosmetic appearance and comfort of the vehicle seat. When needed, the built-in child seat can be deployed to expose a belt-type harness restraint that is provided for physically restraining a child within the child seat. Following use, the integral child seat can be easily returned to its stowed position concealed within the seatback. Typically, a manually-operable latching mechanism is also provided for releasably latching the integral child seat in its stowed position.

As will be appreciated, motor vehicles equipped with seats having one or more built-in child restraint seats are extremely popular in view of the enhanced convenience they provide. However, since built-in child restraint seats are typically integrated into otherwise conventional vehicular seats, various regulatory standards have been promulgated which set forth specific performance criteria and testing requirements. To comply with these standards, it is again common for vehicle manufacturers to establish limitations on the size and weight of children to be seated in the built-in child seat. For example, in one existing commercial vehicular seating arrangement, the built-in child seat is used in one of two distinct modes depending on the weight of the child. In the first mode, the child seat belt-type harness is used to retain a child weighing between twenty and forty pounds. In the second or "booster seat" mode, the child seat belt-type harness is stowed and the vehicle mounted safety belt restraint system is used to strap a child weighing over forty pounds into the built-in child restraint seat. Unfortunately, such a "dual-mode" child restraint arrangement severely limits the placement and applicability of built-in child restraint seats due to the above-noted reliance on use of the vehicle mounted safety belt restraint system. Thus, it would be desireable to provide a vehicular seating arrangement equipped with a built-in "single-mode" child restraint seat having the capacity to physically restrain children weighing more than forty pounds using the child seat belt-type harness restraint.

Moreover, it is known to equip "stand-alone" vehicle seats (such as those mounted in the middle section of a van-type passenger vehicle) with a pair of built-in child restraint seats. Thus, such a vehicle seat must be capable of restraining two children during a vehicular collision. In one existing commercial "stand-alone" vehicle seat, only one of the built-in child seats can be used in the above-noted dual-mode capacity as a booster seat for children weighing over forty pounds. The other built-in child seat is only adapted for use as a single-mode child seat for restraining children weighing up to forty pounds using its belt-type harness. Unfortunately, such a seating arrangement could potentially be confusing to the user and lead to misuse of the built-in child seats. Thus, it would also be desireable to provide a stand-alone vehicle seat having a pair of built-in "single-mode" child seats capable of restraining children weighing more than forty pounds using the child seat belt-type harness.

As is further obvious, the primary function of any vehicle seat having a built-in child restraint seat is to restrain the child when the vehicle is subjected to a sudden impact or a heavy braking condition. However, due to the integration of built-in child seats into the rigid frame structure of otherwise conventional vehicular seats, the child seat occupant absorbs a significant portion of the impact forces generated in response to such a vehicular impact or heavy braking condition. Thus, it would also be desireable to provide a vehicular seat and built-in child restraint seat combination that reduces the impact forces transmitted to the occupant of the child seat.

SUMMARY OF THE INVENTION

Accordingly, the present invention is generally directed to providing a vehicular seat equipped with an integral or "built-in" child restraint seat which overcomes the above-noted and other shortcomings of conventional integrated vehicular seats and concomitantly provides means for absorbing a portion of the impact energy generated during a vehicular collision. More particularly, the present invention is directed to an improved "stand-alone" vehicle seat having a pair of built-in child restraint seats.

In a preferred form, the integrated vehicular seat of the present invention has a frame structure that is adapted to yield (i.e., deform, bend, etc.) in a controlled manner under certain high load conditions to absorb a larger portion of the impact energy that would otherwise be transmitted directly to a child strapped in a built-in child seat. More particularly, the frame structure associated with the integrated vehicular seat of the present invention includes a seat frame assembly and a seatback frame assembly. A pair of modular child seat assemblies are secured to the seatback frame assembly. The frame structure includes first yieldable means for permitting the seatback frame assembly to deform in a controlled manner relative to the seat frame assembly. The frame structure further includes second yieldable means for permitting the interconnection between each of the modular child seat assemblies and the seatback frame assembly to also deform in a controlled manner.

As a related object, the above-noted features enable the built-in child seats of the integrated vehicle seat to accommodate children weighing in excess of the conventional forty pound weight limit using the child seat's belt-type harness. More particularly, it is contemplated that the controllably yieldable characteristics of the frame structure for the integrated vehicle seat of the present invention will permit each of the "single-mode" built-in child seats to accommodate and restrain a child weighing up to sixty pounds using the child seat belt-type harness. As a result, enhanced user convenience and child comfort is promoted while a greater range a vehicular integrated seating applications can be realized.

Additional objects, advantages, and features of the present invention will become apparent to those skilled in the art from studying the following written description and appended claims, taken in conjunction with the accompanying drawings.

BRIEF DESCRIPTION OF THE DRAWINGS

FIG. 8 is an exploded perspective view of the child seat module shown in FIG. 7.

DETAILED DESCRIPTION OF THE PREFERRED EMBODIMENT

The present invention is generally directed to an improved vehicular seating arrangement having a child restraint seat that is integrated or "built-in" to a vehicle seat. More particularly, a preferred embodiment of such an integrated vehicle seat is disclosed which offers improved functional and operational advantages over conventional integrated vehicle seats. Thus, it is to be understood that while the present invention is hereinafter disclosed in association with a particular vehicular seating arrangement, this seating arrangement is merely an exemplary representation of but one type to which the present invention is readily applicable. In addition, it is contemplated that the integrated vehicle seat of the present invention can also be utilized in other passenger-carrying vehicles, such as airplanes, buses, trains and the like.

Figure 1:
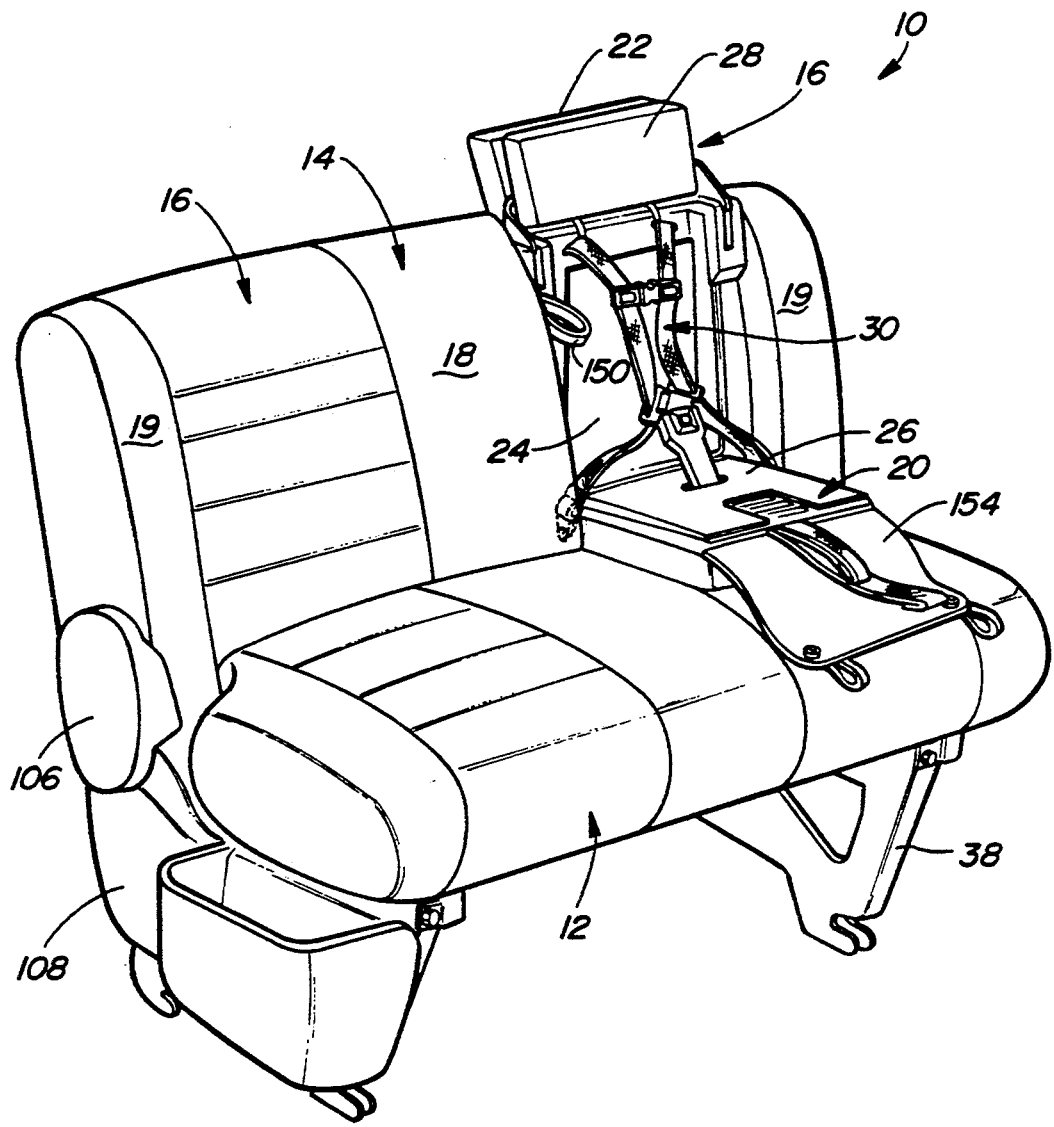
FIG. 1 is a perspective view of an exemplary bench-type vehicle seat having two integral or "built-in" child restraint seats, and which shows one of the integral child seats in a "stowed" position and the other integral child seat in a "deployed" position.

Referring now to the drawings, and particularly to FIG. 1, an exemplary seat 10 of the type commonly used in passenger-type motor vehicles is shown. More particularly, seat 10 is shown as a "stand-alone" two-occupant bench seat of the type commonly installed in the middle seating section of a van type motor vehicle. However, those skilled in the art will recognize that the principles of the present invention, to be hereinafter described in great detail, are likewise readily adaptable to virtually any vehicle seating arrangement including single, tandem, or three-occupant bench seats with fixed or movable seatbacks (i.e., bedseats).

With continued reference to FIG. 1, bench seat 10 is shown to generally include a seat assembly 12, a backrest assembly 14 and a pair of "built-in" child restraint seats 16 integrated into backrest assembly 14 between a central padded portion 18 and padded end portions 19. Each integral child seat 16 includes a seat member 20 and a headrest member 22. As shown, one side of bench seat 10 is in a normal seating position with its integral child seat retracted into a "stowed" position while the other integral child seat is shown deployed to an "operative" position. In the stowed position, the integral child seat is completely concealed within backrest assembly 14 such that bench seat 10 has the cosmetic appearance and function of an otherwise conventional bench seat. Moreover, when integral child seats 16 are stowed, bench seat 10 can be used in the usual manner with an adult or a larger child restrained by a conventional vehicular safety belt restraint system (not shown). However, when an integral child seat 16 is deployed, a back pad 24, a seat pad 26, a headrest pad 28 and a safety belt restraint system, shown as a belt-type harness restraint 30, are exposed.

With particular reference now to FIGS. 2 through 8, various novel and non-obvious structural features of vehicle seat 10 are more clearly illustrated. In general, vehicle seat 10 includes various primary sub-assemblies and components including a seatback frame assembly 32, a seat cushion frame assembly 34, a pair of child seat modules 36 (one shown), a pair of riser assemblies 38, an upholstered seatback pad 40, and an upholstered seat cushion 42. As is evident, seat assembly 12 is generally comprised of seat cushion frame assembly 34, risers 38, a spring and mat assembly 44 and upholstered seat cushion 42. Likewise, backrest assembly 14 is generally comprised of seatback frame assembly 32, upholstered seatback pad 40 and child seat modules 36. As will be clearly detailed, each child seat module 36 is mounted to seatback frame assembly 32 in a manner permitting controlled deformation of the interconnection therebetween for absorbing a portion of the energy generated during a vehicular impact and transmitted to vehicle seat 10. In addition, seatback frame assembly 32 is secured to seat cushion frame assembly 34 and includes means for permitting controlled deformation thereof to likewise absorb a portion of the impact energy exerted on vehicle seat 10 to further minimize the impact forces ultimately transmitted to a child seated in one of child seat modules 36.

Figure 2:
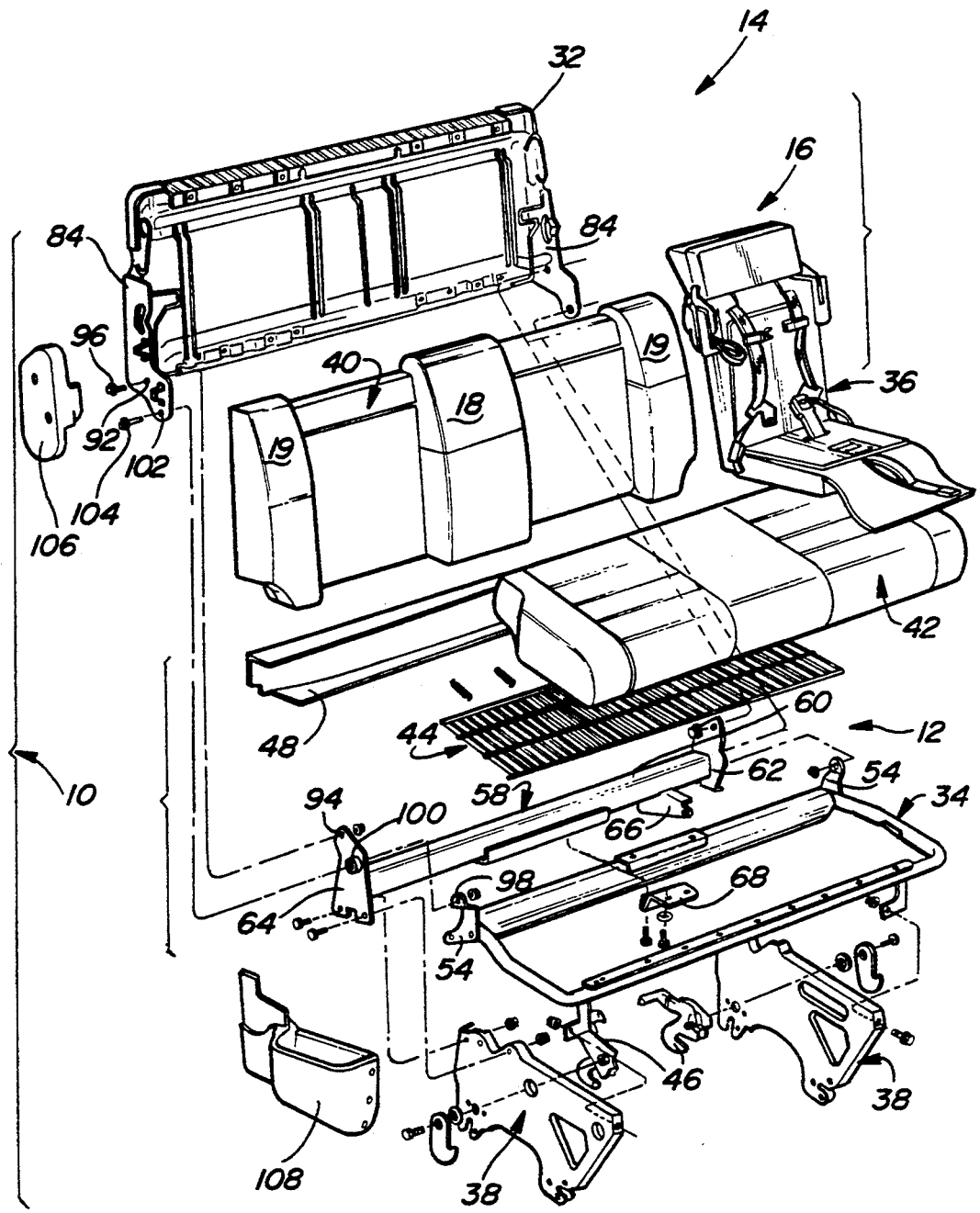
FIGS. 2 is an exploded perspective view of the vehicle seat shown in FIG. 1.
Figure 3:
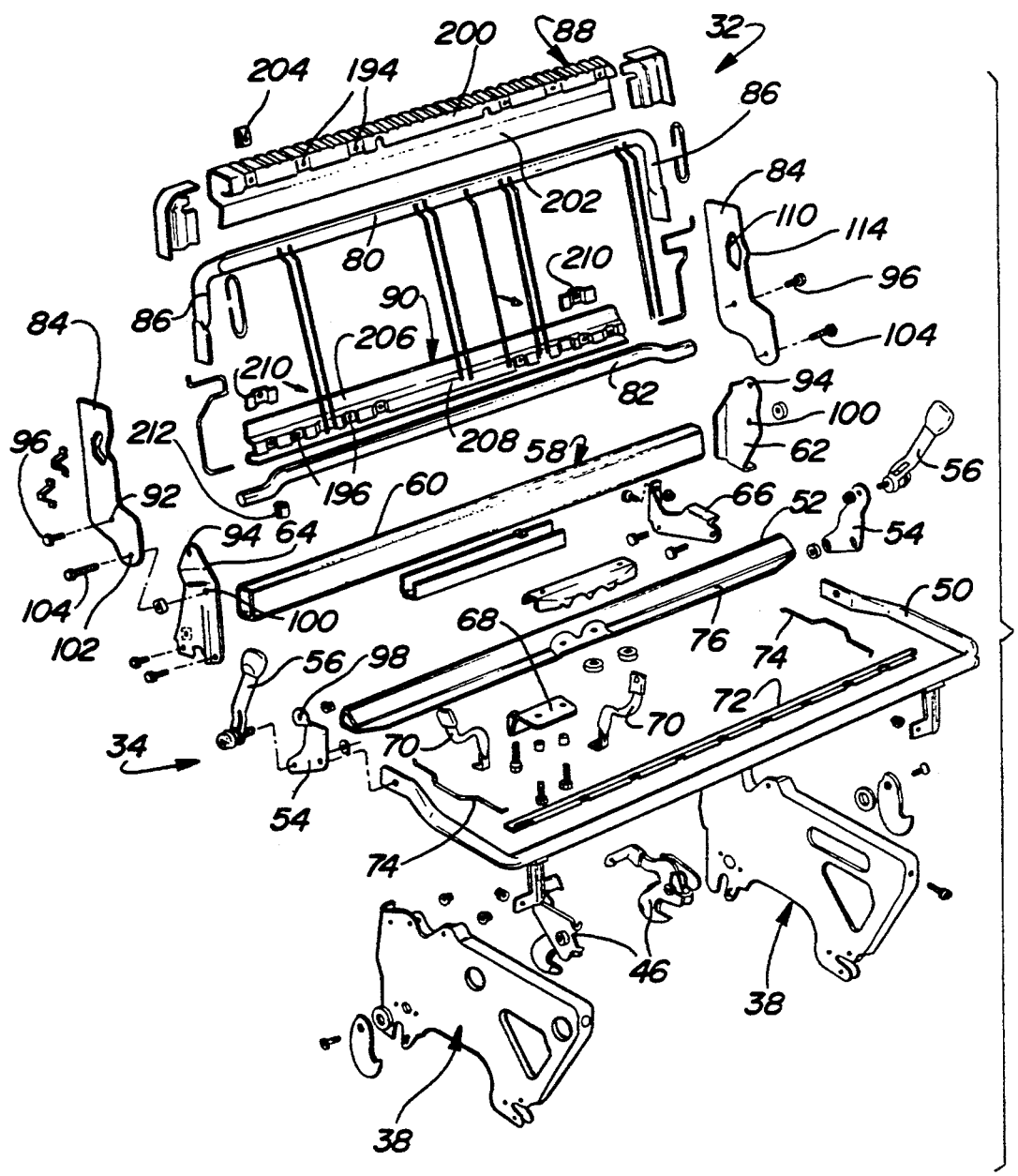
FIG. 3 is an exploded perspective view of the seatback frame assembly and seat frame assembly shown in FIG. 2.
Figure 4:
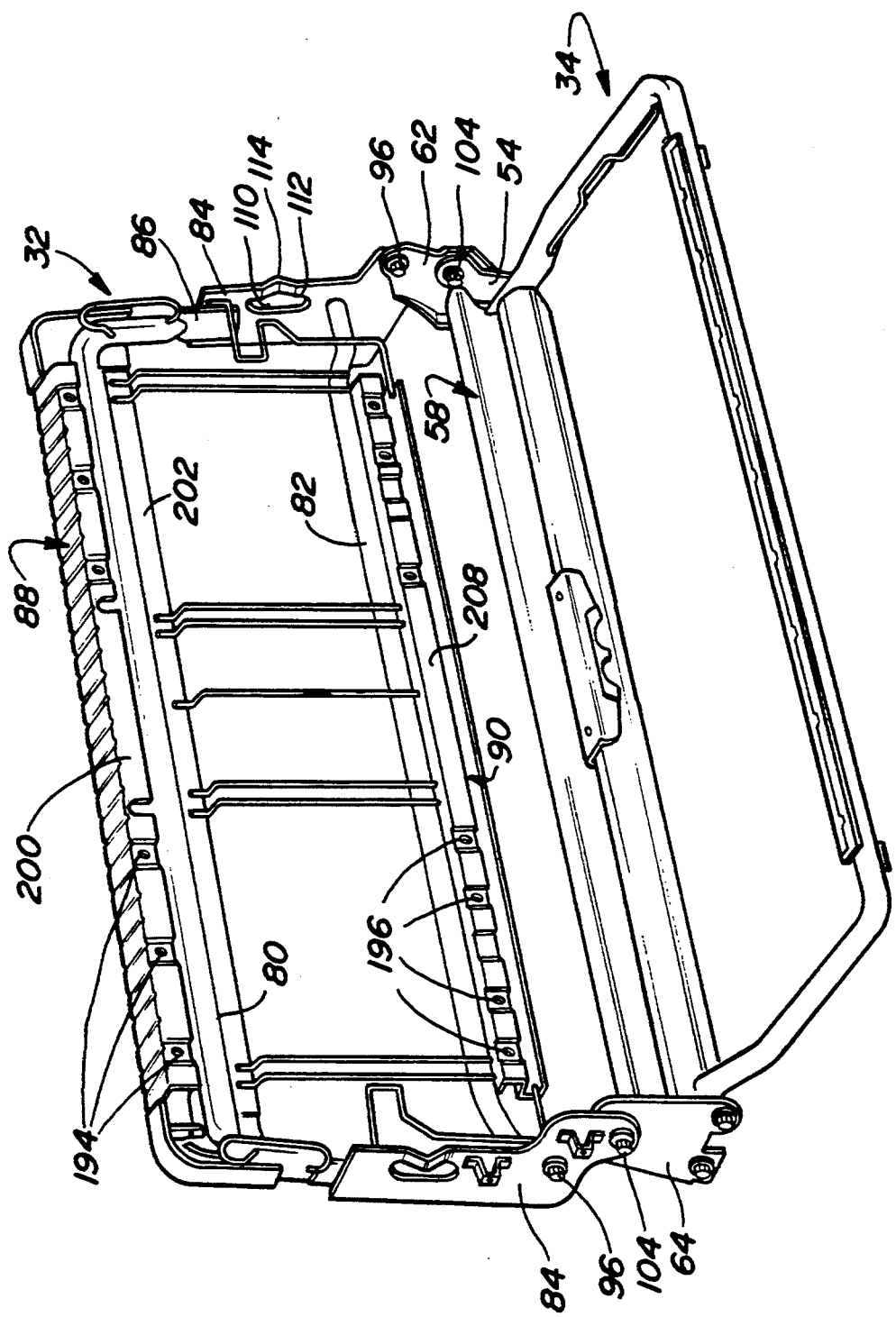
FIG. 4 is a perspective view of the frame structure for the vehicle seat shown in of FIG. 1 illustrating the controllably yieldable seatback frame assembly interconnected to the seat frame assembly.

As best seen from FIGS. 2 through 4, seat cushion frame assembly 34 is fixedly mounted to a pair of laterally-spaced riser assemblies 38. Each riser assembly 38 includes a manually-operable lever-actuated latch assemblies 46 for releasably gripping floor cleats (not shown) that extend from a reinforced floor portion of the motor vehicle. Latch assemblies 46 may be selectively actuated for permitting vehicle seat 10 to be removed from the motor vehicle in a known manner. In addition, an elongated latch cover member 48 is mounted to seat assembly 12 and extends across substantially the entire lowermost rear portion of vehicle seat 10.

Seat cushion frame assembly 34 is designed to be rigid in construction and includes a tubular U-shaped front cross member 50, a tubular rear cross member 52 that is fixed (i.e. welded) to the terminal ends of front cross member 50, and a pair of stanchion brackets 54 bolted to the terminal ends of front cross member 50 so as to be in general alignment with rear cross member 52. As seen in FIG. 3, an outboard belt buckle assembly 56 is anchored (i.e., bolted) to a lower extension segment of each stanchion bracket 54. In addition, a reinforced sub-frame 58 is secured to a rear portion of seat cushion frame assembly 34 which is adapted for interconnection with seatback frame assembly 32. Sub-frame 58 includes an elongated tubular beam 60 and a pair of spacer brackets 62 and 64 that are fixed (i.e., welded) to opposite ends of beam 60. A riser attachment bracket 66 is secured to tubular beam 60 in general proximity to spacer bracket 62 for suitable interconnection to a rearward portion of the one of riser assemblies 38 adjacent thereto. Likewise, spacer bracket 64 has a pair of threaded bores that are alignable with corresponding bores formed in the one of riser assemblies 38 adjacent thereto (as shown by phantom lines in FIG. 2) such that suitable fasteners can be inserted through the aligned bores to fix spacer bracket 64 directly to its corresponding riser assembly 38. In addition a central anchor bracket 68 is secured to rear cross member 52 and tubular beam 60 to provide a rigid surface to which a pair of inboard belt buckle assemblies 70 are secured. Finally, a front mat retainer 72 and a pair of lateral side wires 74 that are mounted to seat frame assembly 34 to provide, in cooperation with an elongated flange segment 76 of rear cross member 52, a support surface upon which upholstered seat cushion 42 is secured.

In accordance with the unique and non-obvious features of the present invention, seatback frame assembly 32 is constructed to permit controlled deformation thereof with respect to child seat modules 36 and seat cushion frame assembly 34 in response to the transmittal of excessively high "impact" loads onto vehicle seat 10 which, for example, may occur during a vehicular impact condition. In essence, this feature is provided for dissipating or absorbing a portion of the impact forces transmitted to vehicle seat 10, thereby reducing the percentage of the total energy that is ultimately transmitted to a child buckled into one of integral child seats 16. As seen from FIGS. 2 through 4, seatback frame assembly 32 comprises a generally U-shaped tubular upper cross member 80, a tubular lower cross member 82, and a pair of seatback plates 84 which interconnect upper cross member 80 and lower cross member 82 to define a generally rectangular seatback frame structure. More specifically, the distal ends of the downwardly extending legs 86 of upper cross member 80 are flattened and suitably fixed (i.e., welded) to an upper planar portion of seatback plates 84. Similarly, the opposite ends of lower cross member 82 are suitably fixed (i.e., welded) to an intermediate portion of seatback plates 84. In addition, seatback frame assembly 32 also includes an upper impact panel 88 and a lower impact panel 90. As will be detailed hereinafter with greater specificity, the seatback frame structure of each child seat module 36 is secured to upper and lower impact seat panels 88 and 90, respectively. Moreover, each impact panel is adapted to yield (i.e., deform, bend, buckle, etc.) in a controlled manner upon the occurrence of a vehicular collision exceeding a predetermined energy level for further minimizing the magnitude of the impact loading transmitted to the child seat occupant. Accordingly, the yield characteristics of impact panels 88 and 90 may be engineered to substantially coincide with those of seat plates 84 or such yield characteristics may be developed to be generally sequential and/or progressive in nature.

To provide means for interconnecting seatback frame assembly 32 to seat cushion frame assembly 34, each seatback plate 84 includes a bore 92 formed in a lower offset portion thereof which is alignable with a bore 94 formed in each of spacer brackets 62 and 64. A suitable fastener 96 is threaded through aligned bores 92 and 94 for interconnecting seatback plates 84 to sub-frame 58 and, in turn, seatback frame assembly 32 to seat frame assembly 34. In a addition, a bore 98 formed in an upper offset portion of each stanchion bracket 54 is alignable with a bore 100 in each spacer bracket 62 and 64 as well as with a bore 102 formed in the lowermost portion of each seatback plate 84. A second fastener 104 is threaded through aligned bores 102, 100 and 98 to further couple seatback frame assembly 32 to seat cushion frame assembly 34. As seen in FIGS. 1 and 2, a seatback plate cover 106 and a utility compartment 108 are provided for concealing the above-noted frame interconnections.

Figure 5:
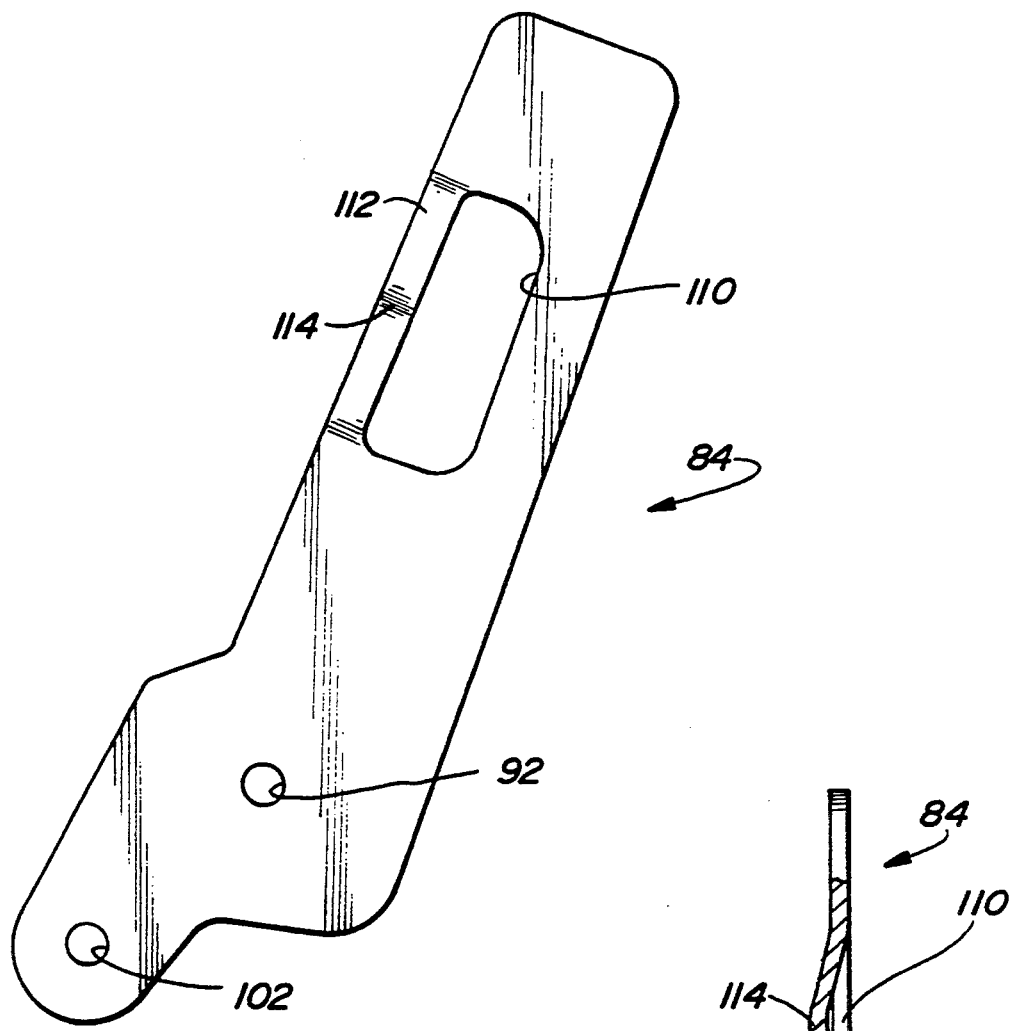
FIG. 5 is a plan view of one of the yieldable seatback plates shown in FIG. 4.
Figure 6:
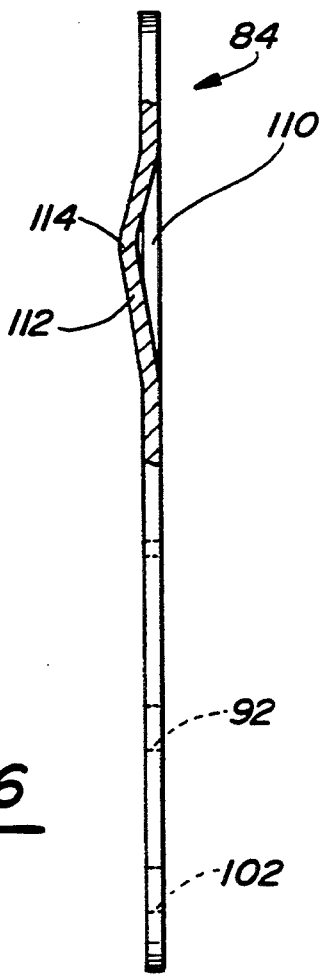
FIG. 6 is a partial sectional view of the seatback plate shown in FIG. 5.

As best seen in FIGS. 5 and 6, each seatback plate 84 has a cut-out 110 formed in an intermediate portion thereof and which defines an elongated web portion 112. A ridge or yield "bump" 114 is formed in web portion 112 to extend out of the general plane of seatback plate 84. Yield bump 114 is adapted to cause seatback plates 84 and, in turn, seatback frame assembly 34 to deform (i.e., bend, twist, etc.) in a controlled manner when the impact loading exerted thereon exceeds a certain predetermined magnitude. However, it should be noted that the deformation of seatback plates 84 is intended to be controlled so as to maintain a solid interconnection between seatback frame assembly 32 to seat frame assembly 34, thereby inhibiting separation therebetween. As will be appreciated, the direction and magnitude of the deformation of seatback frame assembly 32 relative to seat cushion frame assembly 34 will depend on which or both of child seats 16 are being used at the time of impact. Moreover, the dimensions (i.e., size, shape, etc.) of web portion 112, yield bump 114 and cut-out 110 as well as the thickness of seatback plates 84 can be selected to generate the desired yield characteristic for a particular vehicular seating application.

With particular reference now to FIGS. 2, 3, 7 and 8, modular child seat assembly 36 and the means for mounting it to seatback frame assembly 32 are shown to more clearly illustrate yet another novel structural and operational feature of the present invention. As noted, modular child seat assembly 36 is secured to a seatback frame assembly 32. More specifically, the basic components of each child seat module 36 include a back support 116, seat member 20 which is coupled for pivotable movement relative to a lower portion of back support 116, and headrest member 22 which is coupled for pivotable movement relative to an upper portion of back support 116. To this end, back support 116 is a structural member that is adapted to be affixed directly to upper and lower impact panels 88 and 90, respectively, of seatback frame assembly 32 for enabling seat member 20 and headrest 22 to pivot between their respective storage and operatively deployed positions. In addition, the underlying frame structure of headrest member 22 and seat member 20 is provided by a head support panel 118 and a seat pan 120, respectively. As will be appreciated, two-occupant bench seat 10 presents particular requirements because of the relatively low back construction associated with bench seats of this type, when compared, for example, to the relatively tall seatback in the rear seat of a sedan-type motor vehicle. For example, the child's seat module 36 of the present invention provides a movable headrest 22 whereas with a higher seatback construction the child's headrest may be provided by a non-movable part of the backrest cushion. However, it will be understood that the principles of the present invention are clearly applicable to the incorporation of built-in child seats into the taller rear seats of sedan-type motor vehicles which do not require a movable headrest as part of the child seat.

As best shown in FIG. 8, a rear portion of seat pan 120 has a pair of flanges 122 that extend downwardly from opposite lateral edges thereof. Flanges 122 are positioned adjacent to a pair of flanges 124 that extend forwardly from lower lateral edges of back support 116 such that bores 126 and 128 within flanges 122 and 124, respectively, are alignable for receipt of a pivot pin 130 therein. Each pivot pin 130 is also used for securing an anchor plate 132 that is retained on each distal end of belt-type harness 30 to the rigid frame structure of child seat module 36. Head support panel 118 is pivotally coupled to an upper reinforced portion of back support 116 by a pair of hinges 134. As shown, an outer bracket portion 136 of each hinge 134 is removably attached, such as by threaded fasteners 138, to the inside edge of an elongated flange 140 that extends forwardly from the upper lateral edges of back support 116. As is further shown, pivoting link portions 142 of each hinge 134 extend upwardly and rearwardly such that a distal end thereof is affixed to one side of head support panel 118. By mounting hinges 134 to flanges 140 that extends forwardly from back support 116, and by utilizing pivoting link portions 142 that extend upwardly and rearwardly, optimal positioning of headrest member 22 is achieved in both the raised operative and lowered storage positions as shown in FIG. 1.

When it is desired to deploy built-in child seat 16, headrest member 22 and seat member 20 are both pivoted to their respective operative positions. In its operatively deployed position, headrest member 22 is elevated over backrest assembly 14 and is latched in place by a conventional spring-biased latch mechanism which is associated with hinge assembly 134. Preferably, the latch mechanism is manually-operated for releasing headrest member 22 from its latched operative position by pulling on release loop 150. Seat member 20, on the other hand, does not latch in its lowered operative position since the weight of a child occupant seated thereon holds it in the deployed position. Moreover, to prevent headrest member 22 or seat member 20 from unintentionally articulating out of their respective stowed positions, headrest member 22 and seat member 20 are preferably latched in place. Headrest member 22 is latched in its lowered stowage position by the same latch mechanism used to latch it in its raised operative position. However, seat member 20 is releasably maintained in its raised stowage position utilizing a latching arrangement 152 which is operable for holding seat member 20 with respect to back support 116.

Figure 7:
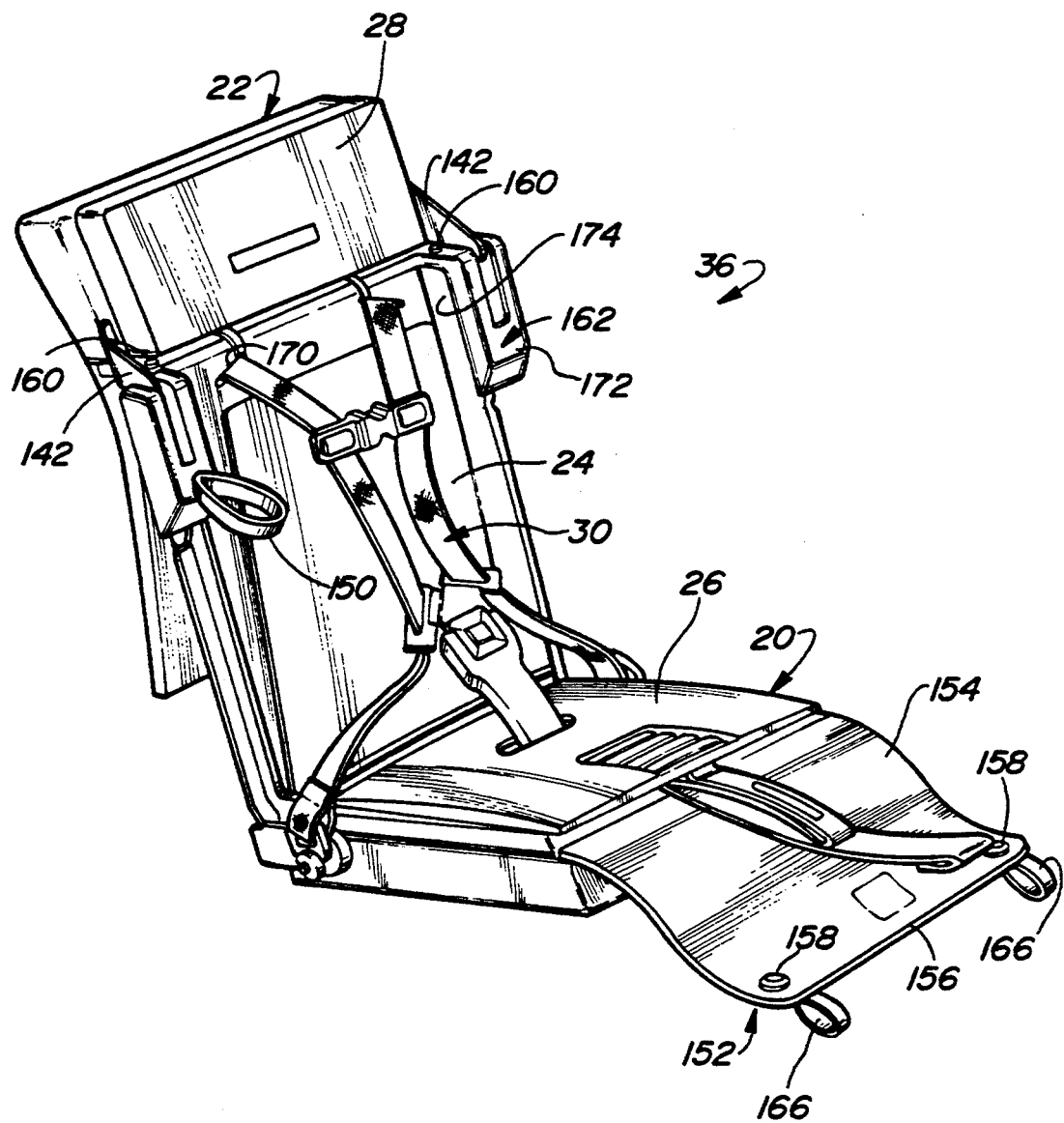
FIG. 7 is a perspective view of the child seat module shown in FIG. 2.

As best shown in FIG. 7, this simplified latching arrangement 152 comprises a pliable member 154 that extends from the free end of seat member 20. Pliable member 154 is preferably made of a fabric-backed vinyl coated material, however, other materials such as cloth, canvas or the like could be utilized. Moreover, a distal end 156 of pliable member 154 has retaining means affixed thereto, preferably snaps 158, that are adapted to engage corresponding snap retainers 160 that extend from a cover member 162 secured to back support 116. When seat member 20 is in its stowed position, pliable member 154 extends vertically along the upholstered outer surface of back pad 24. Moreover, snaps 158 at distal end 156 of pliable member 154 engage corresponding snap retainers 160. In order to engage snaps 158 with snap retainers 160, pliable member 154 must be of a predetermined size (i.e., length) to prevent seat member 20 from articulating out of its stowed position toward its deployed position. Moreover, in order to prevent snaps 158 on pliable member 154 from disengaging snap retainers 160 during a sudden deceleration of the vehicle, snap retainers 160 in this particular embodiment are oriented vertically. Thus, when the inertia of seat member 20 urges it to pivot forwardly toward its deployed position during such a deceleration, thereby tensioning pliable member 154, snaps 158 are loaded in shear. While snaps 158 are readily released from engagement with snap retainers 160 by pulling pliable member 154 vertically away from snap retainers 160, snaps 158 will not disengage snap retainers 160 when snaps 158 are loaded in horizontal shear (i.e., when loaded perpendicular to the orientation of snap retainers 160).

To further ensure that snaps 158 maintain seat member 20 in its raised stowage position, headrest member 22 is adapted to engage pliable member 154 when it is articulated into its lowered stowage position. When headrest 22 is latched in its lowered stowage position, pliable member 154 is sandwiched between headrest member 22 and back support 116. By engaging headrest member 22 with pliable member 154, headrest member 22 provides both a reactive force and frictional forces when seat member 20 is urged toward its lowered deployed position. In other words, when child seat 16 is stowed as shown in FIG. 1, and seat member 20 is urged to articulate toward its deployed position, the proximal end 156 of pliable member 154 attached to seat member 20 is urged to move in a forward direction. As a result, distal end 156 of pliable member 154 is tensioned against snaps 158 while a central portion of pliable member 154 loads against headrest member 22. However, since headrest member 22 is mechanically latched in its stowage position via latch mechanism, headrest member 22 is held stationary and provides a reactive force against pliable member 154 that assists in preventing seat member 20 from articulating toward its deployed position. Moreover, since headrest member 22 is latched in its stowage position, pliable member 154 is maintained in its vertical orientation, sandwiched between headrest member 22 and back support 116. Thus, tension within pliable member 154 is strictly maintained in a direction perpendicular to snap retainers 160, thereby ensuring that snaps 158 are loaded horizontally in shear.

In order to deploy child seat 16 from its latched and stowed position to its deployed operative position, the first step is to actuate the latch mechanism via release loop 150 for unlatching headrest member 22 and subsequently articulate headrest 22 to its elevated operative position above backrest assembly 14. Next, snaps 158 on pliable member 154 are then disengaged from snap retainers 160 by grasping finger loops 166 that extend from pliable member 154 near snaps 158 and pulling them vertically upwardly in a direction parallel to snap retainers 160. Thereafter, seat member 20 is free to articulate toward its lowered deployed position supported upon seat cushion 42 of bench seat 10. In this operative position, belt-type harness restraint 30, which extends through slots 168 in the upper portion of back support 116 and slots 170 in cover member 162, is exposed and ready for restraining the child occupant in a known manner.

As shown in FIG. 1, when seat member 20 is in its deployed position, pliable member 154 extends forwardly along seat cushion 42 of bench seat 10 in front of seat member 20. In this position, pliable member 154 serves as a protective cover for seat cushion 42 of bench seat 10, preventing mud or other debris from soiling the bench seat upholstery. Therefore, not only does pliable member 154 greatly simplify the construction and operation of child seat 16 by eliminating the need for a complicated seat latch mechanism, it also serves as a protective "mud flap" that prevents the upholstered surface of bench seat 10 from becoming soiled by the child occupant.

According to yet another feature of child seat module 36, energy absorbing means is incorporated into cover member 162. In a preferred form, cover member 162 is fabricated (i.e, molded) from a suitable energy absorbing material, such as a thermoplastic foam or the like. Moreover, cover member 162 spans the upper portion of back support 116 and has a pair of end portions 172 that extend from each end thereof in a forward direction. Thus, a recess 174 is defined within cover member 162 for receiving a portion of the occupant's upper torso region. Accordingly, when a child is seated in integral child seat 16, the child's upper torso is at least partially disposed within recess 174. As is shown, end portions 172 extend forward from cover member 162 such that the inner opposing surfaces on end portions 172 limit the amount of lateral movement permitted by the child occupant operatively seated therein.

Child seat module 36 of the present invention further includes incorporation of an additional energy absorbing means disposed within headrest member 22. Preferably, headrest member 22 includes a layer or pad 180 of energy absorbing material in addition to the conventional cushioning materials. Thus, a portion of the energy dissipated is absorbed by the crushing of pad 180. Therefore, the amount of energy absorbed by child occupant in his/her head and upper torso regions is reduced. In order to ensure that the energy absorbing material crushes, a backing member is provided to support the energy absorbing material against a rigid surface. As depicted in FIG. 8, head support panel 118 serves as the backing member for supporting energy absorbing pad 180 within headrest member 22. More particularly, head support panel 118 supports energy absorbing pad 180 and a cushion pad 182 that extends forwardly from head support panel 118. Note, cushion pad 182 and energy absorbing pad 180 are surrounded by conventional upholstery materials, shown as an upholstered hood-type assembly 184. If the occupant's head loads rearwardly into headrest 22, head support panel 118 supports energy absorbing pad 180, thereby allowing the material to crush, rather than simply deflect as a result of the load. On the other hand, when headrest 22 is in its stowage position and an adult occupant (not shown) is sitting on bench seat 10, the occupant's body contacts the upholstered hood 184 adjacent to a rear cushion 186.

In addition to the above described features, the present invention also includes still further means for absorbing a portion of the energy associated with a vehicular impact condition. As previously noted, child seat module 36 is mounted to seatback frame assembly 32 in such a manner to permit deformation of the interconnection therebetween, whereby such deformation absorbs some of the impact energy that would otherwise be transmitted to the child seat occupant. With reference to FIGS. 2, 3, 4 and 8, back support 116 is shown to include a plurality of upper bores 190 and lower bores 192 which are respectively alignable with a similar number of bores 194 formed in upper impact panel 88 and bores 196 formed in lower impact panel 90. As can be seen, bores 194 and 196 are formed in offset portions of their respective impact panels. More particularly, bores 194 are formed in a generally rectangular box-like portion 200 of upper impact panel 88 which extends substantially along the entire length of seatback frame assembly 32. A planar lower flange portion 202 of upper impact panel 88 extends downwardly and is suitably fixed (i.e., welded) to a flattened uppermost portion of upper cross member 80. While not shown, reinforcement brackets or plates can be positioned adjacent to and behind each bore 194 such that U-nut fasteners 204 can be driven through aligned bores 190 and 194 to secure the upper portion of back support 116 to upper impact panel 88. Likewise, lower impact panel 90 has an upwardly extending flange portion 206 which is suitably fixed (i.e., welded) to lower cross member 82. As noted, bores 196 are formed in an elongated offset portion 208 of lower impact panel 90. Offset portion 208 is adapted to permit use of reinforcement plates 21 0 when U-nut fasteners 21 2 are driven through aligned bores 192 and 196 for securing the lower portion of back support 116 to lower impact panel 90. In addition, the offset portion of each impact panel is designed to be rigid, yet deform in a controlled manner due to impact loading exerted on child seat modules 36. Moreover, while impact panels 88 and 90 are designed to yield under certain conditions, each is adapted to maintain a rigid connection with back support 116 of child seat module 36 to inhibit separation thereof from seatback frame assembly 32. As a final feature, upper impact panel 88 is further adapted to act as a strike bar for persons sitting in a vehicle seat positioned behind vehicle seat 10 (i.e., a third row seat), whereby upper impact panel 88 will deform upon such impact to absorb a portion of the impact associated therewith.

In summary, vehicle seat 10 of the present invention provides a number of advantages over conventional vehicle seats. More specifically, the novel concept of providing a vehicle seat frame structure incorporating means predisposed to yield under certain controlled conditions is a significant design improvement over currently known integrated seating arrangements. Thus, the primary objective of the present invention is to absorb a portion of the total impact energy exerted on vehicular seat 10, thereby reducing the overall amount of energy transmitted to a child seat occupant.

The foregoing discussion discloses and describes a exemplary embodiment of the present invention. For example, the above-noted controllably yieldable interconnection between the seat frame assembly and the seatback frame assembly can be incorporated into vehicle seats having a reclinable backrest assembly such as those commonly referred to as bedseats. Thus, one skilled in the art will readily recognize from such discussion, and from the accompanying drawings and claims, that various changes, modifications and variations can be made therein without departing from the spirit and scope of the invention as defined in the following claims.

What is claimed is:

1. A vehicle seat comprising:
a seatback frame assembly;
a seat cushion frame assembly interconnected to said seatback frame assembly;
a child seat module; and
interconnecting means for securing said child seat module to said seatback frame assembly, said interconnecting means includes an upper panel and a lower panel that are each secured to said seatback frame assembly and to which a back support member of said child seat module is fixed, said upper and lower panels are adapted to be controllably yieldable for permitting the interconnection between said back support member and said upper and lower panels to deform in a controlled manner in response to a load being exerted on said vehicle seat exceeding a predetermined magnitude.

2. The vehicle seat of claim 1 wherein said seatback frame assembly includes second interconnecting means for securing said seatback frame assembly to said seat cushion frame assembly, said second interconnecting means including a pair of yieldable members that are adapted to permit said seatback frame assembly to deform in a controlled manner relative to said seat cushion frame assembly in response to said load being exerted on said vehicle seat.

3. The vehicle seat of claim 2 wherein said seatback frame assembly further includes an upper frame member and a lower frame member, and said pair of yieldable members comprises a pair of seatback plates fixed between said upper and lower frame members, said seatback plates each having a cut-out segment that is adapted to yield in response to said load for causing said seatback plate to deform in a controlled manner with respect to said seat cushion frame assembly.

4. The vehicle seat of claim 1 wherein said seatback frame assembly includes an upper frame member, a lower frame member, and a pair of seatback plates fixed between said upper and lower frame members, said seatback plates each having a cut-out segment adapted to yield for causing said seatback plate to deform in a controlled manner with respect to said seat cushion frame assembly.

5. The vehicle seat of claim 4 wherein deformation of said seatback plates in response to said load being exerted on said vehicle seat causes said upper frame member to move relative to said lower frame member.

6. The vehicle seat of claim 4 wherein said seatback plates are further adapted for interconnecting said seatback frame assembly to said seat cushion frame assembly.

7. A vehicle seat comprising:
a seatback having a seatback frame assembly including an upper frame member and a lower frame member spaced therefrom;
a seat cushion having a seat cushion frame assembly;
a child seat module;
first interconnecting means for interconnecting said seatback frame assembly to said seat cushion frame assembly, said first interconnecting means comprising a pair of seatback plates interconnecting said upper and lower frame members and which are adapted to controllably deform in response to a load being exerted on said vehicle seat exceeding a predetermined magnitude; and
second interconnecting means for interconnecting said child seat module to said seatback frame assembly.

8. The vehicle seat of claim 7 wherein deformation of said seatback plates in response to said load being exerted on said vehicle seat causes said upper frame member to move relative to said lower frame member.

9. The vehicle seat of claim 7 wherein said second interconnecting means includes an upper panel and a lower panel that are each secured to said seatback frame assembly and to which a back support member of said child seat module is fixed, said upper and lower panels are adapted to be controllably yieldable for permitting the interconnection between said back support member and said upper and lower panels to deform in response to said load being exerted on said vehicle seat.

10. The vehicle seat of claim 9 wherein said upper panel is further adapted to yieldably deform in response to being struck by a person seated behind said vehicle seat for absorbing a portion of the impact energy associated therewith.

11. The vehicle seat of claim 7 wherein both of said first and second interconnecting means are adapted to yieldably deform in response to said load being exerted on said vehicle seat.

12. In a vehicular seat having a built-in child restraint seat integrated into its underlying frame structure, said frame structure comprising:
a seat frame assembly;
a seatback frame assembly having a pair of spaced apart upper and lower frame members; and
a pair of yieldable members each having a first portion interconnecting to said upper and lower frame members of said seatback frame assembly and a second portion interconnected to said seat frame assembly, said yieldable members are adapted to controllably deform in response to the vehicular seat being subjected to a load exceeding a predetermined value for causing said seatback frame assembly to deform in a controlled manner relative to the seat frame assembly.

13. The vehicle seat frame structure of claim 12 further comprising a pair of second yieldable members mounted to said seatback frame assembly for interconnecting a back support member of said built-in child restraint seat to said seatback frame assembly, said second yieldable members being adapted to controllably deform in response to said load being exerted thereon for causing said built-in child restraint seat to deform in a controlled manner relative to said seatback frame assembly.

* * * * *